United States Patent
Yoon et al.

(12)

(10) Patent No.: US 7,642,757 B2
(45) Date of Patent: Jan. 5, 2010

(54) SYSTEM AND METHOD FOR AUTOMATICALLY OPERATING UPFC (UNIFIED POWER FLOW CONTROLLER) CONNECTED TO SCADA (SUPERVISORY CONTROL AND DATA ACQUISITION)

(75) Inventors: Jong-Soo Yoon, Daejeon Metropolitan (KR); Seung-Pil Moon, Daejeon Metropolitan (KR); Won-Kyo Lee, Daejeon Metropolitan (KR); Chang-Gon Kim, Daejeon Metropolitan (KR); Jin-Boo Choo, Daejeon Metropolitan (KR); Young-Cheul Choi, Daejeon Metropolitan (KR); Young-Soo Jeon, Daejeon Metropolitan (KR); Byung-Hoon Chang, Daejeon Metropolitan (KR); Soo-Yeol Kim, Daejeon Metropolitan (KR)

(73) Assignee: Korea Electric Power Corporation, Seoul (KR)

( * ) Notice: Subject to any disclaimer, the term of this patent is extended or adjusted under 35 U.S.C. 154(b) by 142 days.

(21) Appl. No.: 11/538,572

(22) Filed: Oct. 4, 2006

(65) Prior Publication Data

US 2007/0250217 A1 Oct. 25, 2007

(30) Foreign Application Priority Data

Apr. 25, 2006 (KR) .................. 10-2006-0037269

(51) Int. Cl.
*G05F 1/70* (2006.01)
*G05F 3/00* (2006.01)
*G05F 5/00* (2006.01)

(52) U.S. Cl. .................. 323/205; 323/207; 323/208; 323/209

(58) Field of Classification Search ........... 323/205, 323/207, 208, 209
See application file for complete search history.

(56) References Cited

U.S. PATENT DOCUMENTS

| | | | | |
|---|---|---|---|---|
| 5,321,376 A * | 6/1994 | MacLean | ........... | 335/17 |
| 5,469,044 A * | 11/1995 | Gyugyi et al. | ........... | 323/207 |
| 5,475,867 A * | 12/1995 | Blum | ........... | 455/507 |
| 5,734,257 A * | 3/1998 | Schauder et al. | ........... | 323/207 |
| 5,808,452 A * | 9/1998 | Gyugyi et al. | ........... | 323/207 |
| 5,889,668 A * | 3/1999 | Schauder et al. | ........... | 363/137 |
| 5,909,105 A * | 6/1999 | Noroozian | ........... | 323/211 |
| 6,396,248 B1 * | 5/2002 | Sen et al. | ........... | 323/209 |
| 6,411,067 B1 * | 6/2002 | Bjorklund | ........... | 323/207 |
| 7,117,070 B2 * | 10/2006 | Chow et al. | ........... | 700/297 |
| 7,177,727 B2 * | 2/2007 | Chu et al. | ........... | 700/287 |
| 7,271,508 B2 * | 9/2007 | Brochu et al. | ........... | 307/147 |

FOREIGN PATENT DOCUMENTS

WO  WO 96/21262  7/1996

* cited by examiner

*Primary Examiner*—Bao Q Vu
(74) *Attorney, Agent, or Firm*—Locke Lord Bissell & Liddell LLP

(57) ABSTRACT

A system and method for operating a Unified Power Flow Controller (UPFC) connected to a SCADA (Supervisory Control and Data Acquisition) are disclosed. The UPFC automatic operation system receives power system data from the SCADA system, automatically determines UPFC's optimum operation conditions according to power system states. The system includes: a UPFC acting as a serial/parallel FACTS to control variables of a power system; a SCADA for periodically acquiring line data of the power system and state data of the UPFC; and an upper controller for analyzing data received from the SCADA, and determining an UPFC's optimum operation mode for each power system condition and UPFC's optimum set-point control commands.

5 Claims, 1 Drawing Sheet

SYSTEM AND METHOD FOR AUTOMATICALLY OPERATING UPFC (UNIFIED POWER FLOW CONTROLLER) CONNECTED TO SCADA (SUPERVISORY CONTROL AND DATA ACQUISITION)

FIELD OF THE INVENTION

The invention relates to a system and method for operating a Unified Power Flow Controller (UPFC), and more particularly to a system for automatically operating a UPFC in connection with a SCADA (Supervisory Control and Data Acquisition) system, which receives power system information from the SCADA, automatically determines optimum operation conditions (control commands or set-point values) according to power system states, and is then operated at the optimum operation conditions, and a method for controlling the same.

DESCRIPTION OF THE RELATED ART

Typically, a UPFC serves as a serial/parallel FACTS (Flexible AC Transmission System), and is able to simultaneously control three variables of power systems (i.e., voltage, active power flow, and reactive power flow). Therefore, the UPFC has difficulty in determining the operation conditions optimally whereas the other FACTS devices(e.g., SVC, SSSC, STATCOM) are required to control only one parameter, such that more complex and difficult operation conditions occur in the UPFC. A conventional manual Set-Point Control method has a disadvantage in that it is difficult to control UPFC optimally in the steady state or abnormal state of the power system. It is mainly since its control method is basically only based on the operator's experience.

However, up to now, the UPFC has been operated by the manual set-point control method according to operation scenarios prescribed by the experienced operators of individual substations or Local Load Dispatching Centers (or Regional Control Centers). However, power system environments always vary with time, and unexpected disturbances can occur by various factors, such that the manual set-point control method has difficulty in properly coping with unexpected variations in power system environments.

The above-mentioned operation procedure(scenario) has been established on the basis of power system operation experiences, such that it can considerably increase the UPFC utility, however, it has the operational limitation to cope with various power system variations or disturbances optimally.

SUMMARY OF THE INVENTION

Therefore, the invention has been made in view of the above problems, and it is an object of the invention to provide a control system connected to a SCADA system for automatically operating a UPFC, which determines optimum operation conditions (commands or set-point values) according to power system states, transmits the optimum operation conditions to the UPFC, optimally operate a FACTS in the steady state, and increase the power system security in the abnormal state, and a method for controlling the same.

In accordance with one aspect of the present invention, these objects are accomplished by providing an control system connected to a SCADA for automatically operating a UPFC, the system comprising: a UPFC acting as a serial/parallel FACTS (Flexible AC Transmission System) to control the variables of the power system; a SCADA for periodically acquiring line data of the power system and state data of the UPFC; and an upper controller(the present invention, an automatic controller) for analyzing data received from the SCADA, and determining an optimum UPFC operation mode and optimum UPFC set-point control commands for each power system states. The UPFC set-point control commands are a line voltage, a active power flow, and a reactive power flow.

Preferably, the power system line data includes voltage data of each bus, line flow data, and contact-point data of a circuit-breaker.

Preferably, the UPFC state data includes analog data related to UPFC operation states, inverter's driving state data, and valve or relay state data.

In accordance with another aspect of the present invention, there is provided a method for automatically operating a UPFC in connection with a SCADA, the method comprising the steps of: a) periodically acquiring, by the SCADA, power system line data and UPFC state data, and transmitting the acquired data to an upper controller; b) analyzing, by the upper controller(an automatic controller), data received from the SCADA, determining an optimum UPFC operation mode for each power system condition and optimum references of power system variables, and transmitting the determined optimum operational references command to the UPFC, and controlling a line voltage, active power, and reactive power flow using the received optimum operation mode data and the power system variables' optimum references received in the UPFC.

Preferably, the step b) for determining the optimum operation mode and the power system variables' optimum references using the upper controller includes the steps of:

b1) analyzing data received from the SCADA, and determining a system state; b2) determining a control objective function appropriate for each state on the basis of the determined system state; b3) determining an operation mode of the UPFC according to the determined control objective; b4) executing an OPF(Optimal Power Flow) process appropriate for each objective; and b5) determining a flow in active/reactive power of a serial side of the UPFC and a voltage reference of a parallel side of the UPFC using the OPF execution result.

BRIEF DESCRIPTION OF THE DRAWINGS

The above objects, and other features and advantages of the present invention will become more apparent after reading the following detailed description when taken in conjunction with the drawing, in which.

DESCRIPTION OF THE PREFERRED EMBODIMENTS

Figure 1:
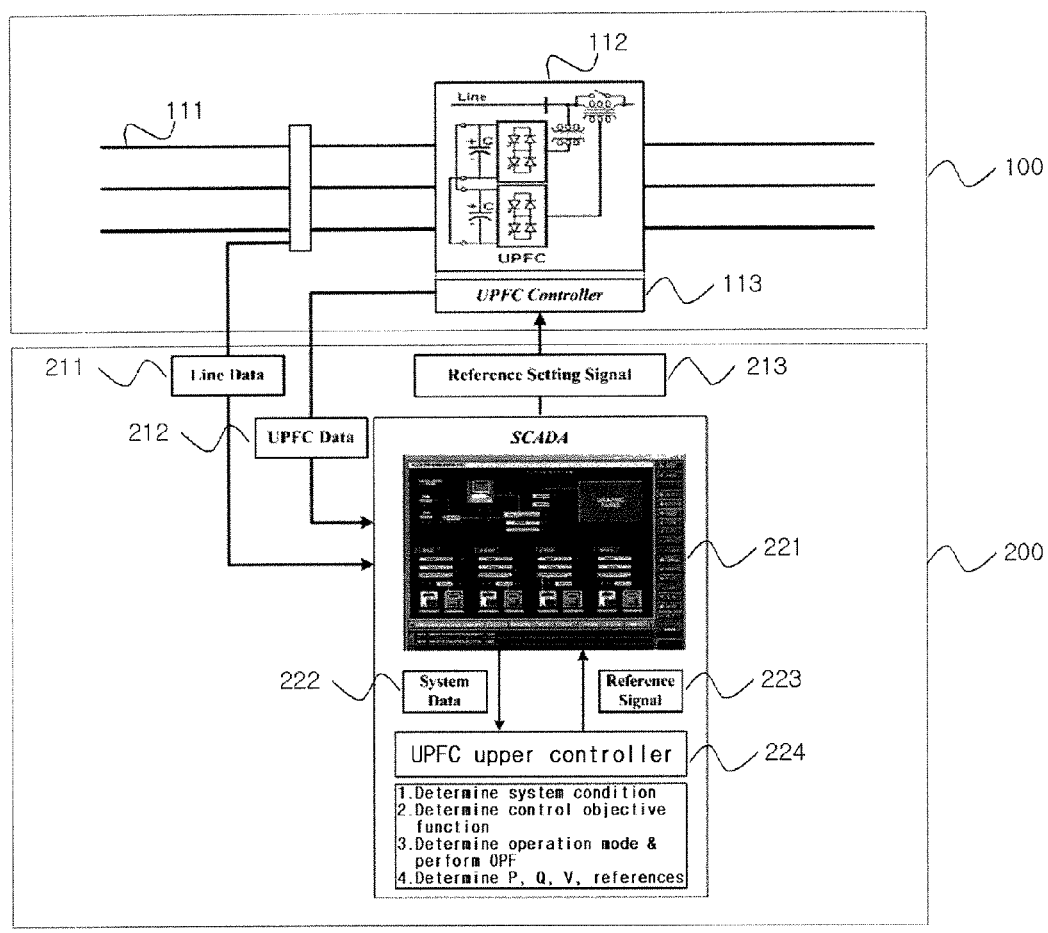
FIG. 1 is a schematic view illustrating a system for automatically operating a UPFC connected to a SCADA in accordance with a preferred embodiment of the present invention.

Now, preferred embodiments of the present invention will be described in detail with reference to the annexed drawings. In the drawings, the same or similar elements are denoted by the same reference numerals even though they are depicted in different drawings. In the following description, a detailed description of known functions and configurations incorporated herein will be omitted when it may make the subject matter of the present invention rather unclear.

A system and method for automatically operating a UPFC connected to a SCADA according to the present invention will hereinafter be described with reference to FIG. 1.

FIG. 1 is a schematic view illustrating a system for automatically operating a UPFC connected to a SCADA in accordance with a preferred embodiment of the present invention.

Referring to FIG. 1, the UPFC automatic operation system connected to the SCADA according to the present invention includes a UPFC 112 for controlling variables/parameters of a power system; a SCADA 221 for periodically acquiring line data of the system and state data of the UPFC; and an upper controller 224 for receiving data from the SCADA 221, analyzing the received data, and determining an optimum mode for each system condition and optimum references of the system variables.

In other words, the above-mentioned UPFC automatic operation system includes the UPFC 112; the SCADA 221 for acquiring not only line data 211 of a power system at which the UPFC 112 is installed but also UPFC operation state data 212; and an upper controller 224 for analyzing the line data 211 and the UPFC operation state data 212, determining state information of the system, and determining an appropriate UPFC operation condition according to the determined state information.

There are a variety of power system variables controlled by the UPFC 112 (for example, a line voltage, a active power flow, and a reactive power flow, etc.). The above-mentioned optimum control references (set-point control commands) are determined by the above-mentioned upper controller.

The SCADA 221 for use in a local system periodically acquires analog data (e.g., a bus voltage of the local system, and a line 111's flow) and digital data (e.g., contact-point information of a circuit-breaker), and transmits the acquired analog and digital data to the upper controller 224. In other words, the SCADA 221 periodically collects the line data 211 (e.g., voltage data of each system bus, line flow data, and contact-point data of a circuit-breaker), and transmits the collected data to the upper controller 224.

The SCADA 221 receives UPFC operation state-associated data (i.e., analog input points) and actual system limitation data (i.e., digital input points) (e.g., an inverter's driving state, and a valve or relay state) from the UPFC 112, and transmits the received data to the upper controller 224. In other words, the SCADA 221 periodically collects the UPFC state data (e.g., analog data associated with UPFC operation states, inverter's driving state data, and valve or relay state data), and transmits the collected UPFC state data to the upper controller 224.

In the meantime, the SCADA 221 receives selection/control mode data (i.e., digital output points) of the UPFC operation configuration and other data 223 associated with UPFC operation command values from the upper controller 224, and transmits the received data to the UPFC controller 113 contained in the UPFC 112.

The principal functions of the upper controller acting as a constituent element of the present invention are 1) system state analysis function, 2) control objective determination function, 3) OPF execution function, and 4) UPFC operation reference determination function, and a detailed description thereof will hereinafter be described.

1) System State Analysis Function:

The upper controller 224 analyzes analog data received from the SCADA 221, and periodically determines system conditions. If an unexpected power system accident (e.g., a line accident) occurs, the upper controller 224 immediately determines system state data on the basis of received digital data. The system state data is determined in consideration of a data acquisition time of the SCADA, and is classified into steady-state data, state data of a bus-voltage drop, state data of a line flow congestion, and state data of a line accident, etc.

2) Control Objective Determination Function:

The upper controller 224 determines control purpose functions appropriate for individual states on the basis of the result of the system state analysis. In this case, the upper controller 224 pre-determines optimum objective functions and operation scenarios of individual states by analyzing off-line system's information, such that it properly uses the predetermined optimum objective functions and operation scenarios.

3) OPF Execution Function:

The upper controller 224 analyzes the UPFC operation mode according to the determined control objective, determines a limited operation value of the UPFC by referring to system state data received from a UPFC RTU, and performs an OPF for each objective.

4) UPFC Operation Reference Determination Function:

The upper controller 224 determines the flow in active/reactive power of the UPFC's serial side and a voltage reference of the UPFC's parallel side, and transmits the determined data 223 to the SCADA 221, such that the UPFC can be operated at optimum operation conditions.

A method for automatically operating the UPFC using the above-mentioned UPFC automatic operation system connected to the SCADA will hereinafter be described.

The SCADA 221 periodically acquires line data 211 and UPFC state data 212, and transmits system data 222 associated with the acquired data 211 and 212 to the upper controller 224.

The upper controller 224 analyzes the received data 222, determines an optimum operation mode for each system condition and optimum references of system variables, and transmits a reference signal 223 to the SCADA 221.

In order to determine the optimum references of the system variables, the upper controller 224 analyzes data received from the SCADA, determines system state data, determines control objective functions appropriate for individual states on the basis of the determined system state data, determines a UPFC's operation mode according to the determined control objective, performs an OPF appropriate for each objective, and determines the flow in active/reactive power of the UPFC's serial side and a voltage reference of the UPFC's parallel side using the above-mentioned OPF's execution result.

The SCADA 221 transmits data indicating the optimum operation mode and the optimum references 223 of the system variables to the UPFC 112. The SCADA 221 controls a line voltage, active power, and reactive power of each system using the optimum operation mode data and the optimum references of the system variables of the UPFC.

As described above, the above-mentioned UPFC automatic operation system according to the present invention applies the conventional UPFC operation method based on the Set-point control scheme to the SCADA, acquires system data in real time, analyzes the acquired system data, and determines an optimum operation condition on the basis of the analyzed system data. The conventional UPFC operation method has been implemented according to a specific operation scenario prescribed by a substation or regional control center or operator's experience.

As apparent from the above description, the system and method for automatically operating the UPFC connected to the SCADA according to the present invention determine system state data using data acquired from the SCADA, and propose an optimum operation condition using the SCADA acquisition data.

Also, the above-mentioned system determines an operation condition to reduce the power system losses, guarantees the implementation of a cost-effective system, and quickly copes with unexpected system accidents, resulting in increased power system security.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A system connected to a SCADA (Supervisory Control and Data Acquisition) for automatically operating a UPFC (Unified Power Flow Controller), the system comprising:
   a UPFC acting as a serial/parallel FACTS (Flexible AC Transmission System) to control variables of a system;
   a SCADA for periodically acquiring line data of the system and state data of the UPFC, the UPFC data including inverter's driving state data; and
   an upper controller for analyzing data received from the SCADA, deciding system state data on the basis of received data, classifying the system state data into steady-state data, state data of a bus-voltage drop, state data of a line accident, determining control objective functions appropriate for individual state based on the result of a system state analysis using predetermined optimum objective functions and operation scenarios by analyzing off-line system's information, analyzing the UPFC operation mode according to the determined control objective, performing an OPF execution for each objective, determining a flow in active/reactive power of the UPFC'S serial side and a voltage reference of the UPFC's parallel side, using an OPF execution result and determining an optimum operation mode for each system condition and optimum operational references (set-point control commands).

2. The system according to claim 1, wherein the operational references (set-point control commands) are a line voltage, line active and reactive power flow.

3. The system according to claim 1, wherein the system line data includes voltage data of each system bus, line flow data, and contact-point data of a circuit-breaker.

4. The system according to claim 1, wherein the UPFC state data further includes at least one of the following: analog data related to UPFC operation states and valve or relay state data.

5. A method for automatically operating a UPFC in connection with a SCADA, the method comprising:
   a) periodically acquiring, by the SCADA, system line data and UPFC state data, including inverter's driving state data, and transmitting the acquired data to an upper controller;
   b) analyzing, by the upper controller, data received from the SCADA, determining an optimum operation mode for each power system condition and optimum references of power system variables, and transmitting the determined data to the SCADA; and
   c) transmitting, by the SCADA, the optimum operation mode data and the optimum references of the system variables to the UPFC, and controlling a line voltage, active power, and reactive power of each system using the received optimum operation mode data and the system variables' optimum references received in the UPFC, and
   wherein step b) includes:
   B1) analyzing data received from the SCADA, deciding system state data based on received data and classifying system state data into steady-state data, state data of a bus-voltage drop, and state data of a line accident,
   b2) determining control purpose functions appropriate for individual state based on the result of the data analysis using predetermined optimum objective functions and operation scenarios by analyzing off-line system's information,
   b3) executing an OPF process appropriate for each objective; and
   b4) determining a flow in active/reactive power of a serial side of the UPFC and a voltage reference of a parallel side of the UPFC using the OPF execution result.

* * * * *